US006865393B1

(12) United States Patent
Baum et al.

(10) Patent No.: US 6,865,393 B1
(45) Date of Patent: Mar. 8, 2005

(54) METHOD AND SYSTEM FOR EXCESS RESOURCE DISTRIBUTION IN A COMMUNICATION SYSTEM

(75) Inventors: Kevin Lynn Baum, Rolling Meadows, IL (US); Brian Keith Classon, Streamwood, IL (US); Philippe Jean-Marc Sartori, Schaumburg, IL (US); Theresa Ann Fry, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/518,160

(22) Filed: Mar. 3, 2000

(51) Int. Cl.[7] ............................................ H04Q 7/20
(52) U.S. Cl. ............................. 455/452.2; 455/452.1; 455/67.13; 455/67.11; 455/522; 375/261; 375/298
(58) Field of Search .................... 455/412, 38.3, 455/433, 67.11, 522, 69, 67.13, 63.1, 450, 561, 226.1, 452.2, 452.1; 370/347, 338, 728, 465, 335, 342; 375/225, 227, 261, 298

(56) References Cited

U.S. PATENT DOCUMENTS

| 5,764,699 | A | * | 6/1998 | Needham et al. ............ 375/261 |
| 5,991,329 | A | | 11/1999 | Lomp et al. |
| 6,198,734 | B1 | * | 3/2001 | Edwards et al. ............ 370/347 |
| 6,381,461 | B1 | * | 4/2002 | Besson et al. ............... 455/450 |
| 6,668,159 | B1 | * | 12/2003 | Olofsson et al. ......... 455/226.1 |

OTHER PUBLICATIONS

Rohling et al., Adaptive Coding and Modulation in an OFDM TDMA Communicaton System, 1998 IEEE.*
A.J. Goldsmith and S.G. Chua, Variable–Rate Variable Power MQAM for Fading Channels, IEEE Transactions on Communications, vol. 45, No. 10, Oct. 1997, pp. 1281–1230.
S. Otsuki, S. Sampei and N. Morinago, Square–QAM Adaptive Modulation/TDMA/TDD Systems Using Modulation Level Estimation with Walsh Function, Electronics Letters, vol. 31, No. 3, Feb. 1995, pp. 169–171.

(List continued on next page.)

Primary Examiner—Charles Appiah
Assistant Examiner—Joy K. Contee
(74) Attorney, Agent, or Firm—Kenneth A. Haas

(57) ABSTRACT

A method and system (102) provide adaptive modulation/coding with distribution of excess resources based on one or more system criteria. The system (102) may be any system with more than one modulation rate or more than one coding rate and may be a wireless communication system using CDMA, TDMA, OFDM or any other signal formats. Generally, the method determines excess resources of the system based on desired characteristics of links supported by the system. The excess resources may be any number of system resources, such as transmit power. These excess resources are then distributed to the links based on various system criteria, such as to increase system coverage, to increase system capacity, to modify a data rate profile of the system or to reduce interference in the system. Methods for providing such distribution of the excess resources are also provided for equal data rate systems.

26 Claims, 11 Drawing Sheets

OTHER PUBLICATIONS

J.M. Torrance and L. Hanzo, Upper Bound Performance of Adaptive Modulation in a Slow Rayleigh Fading Channel, Electronics Letterxs, vol. 32, No. 8, Apr. 1996, pp. 718–719.

Y. Kamio, S. Sampei, H., Sasaoka and N Morinaga, Performance of Modulation–level–controlled Adaptive–modulation Under Limited Transmission Delay Time for Lane Mobile Communications, Proceedings of the 45the IEEE Vehicular AT4echnology Conference, Chicago, IL, Jul. 1995, pp. 221–224.

H. Marsuoka, S. Sampei, N. Morinaga, and Y. Kamio, "Adaptie Modulation System with Variable Coding Rate Concatenated Code for High Quality Multi–Media Communication System," VTC '96, pp. 487–492, Apr. 1996.

H. Rohling, R. Grunheid, Adaptive Coding and Modualtion in an OFDM–Tdma Communication System, VTC '98, May 1998.

W.T. Webb and R. Steele, "Variable Rate QAM for Mobile Radio," IEEE Transactions on Communications, vol. 43, No. 7, Jul. 1995, pp. 2223–2230.

* cited by examiner

METHOD AND SYSTEM FOR EXCESS RESOURCE DISTRIBUTION IN A COMMUNICATION SYSTEM

BACKGROUND OF THE INVENTION

The present invention relates generally to a method and system for providing adaptive modulation/coding and adaptive power allocation in a communication system and, more particularly, to a method and system for providing adaptive modulation/coding and excess resource distribution in accordance with one or more desired system criteria.

Adaptive modulation/coding (AMC) is a link adaptation method that has been employed in telecommunication systems to improve system performance. With AMC, users with high carrier to interference (C/u) ratios enjoy high data rates that contribute significantly to system capacity. Conversely, users that have a poor C/I require a much lower data rate. Unfortunately, current AMC methods have two limitations. First, a number of users may not have a sufficient C/I to support the lowest of the modulation/coding rates (MCRs) in the system. These users are unable to access the system, and as a result, the system coverage reliability is reduced. Second, the current AMC methods do not make the most efficient use of the available transmit power because users are normally assigned an MCR that has a lower C/I requirement than the actual C/I of the user.

Accordingly, there is a need for a method and system which implements a link adaptation method which achieves relatively high system capacity and system coverage and which provides flexibility to modify the link adaptation method to achieve a number of different system criteria.

BRIEF DESCRIPTION OF THE DRAWINGS

The foregoing and other advantages of the invention will become apparent upon reading the following detailed description and upon reference to the drawings in which.

DETAILED DESCRIPTION OF THE PREFERRED EMBODIMENTS

Figure 1:
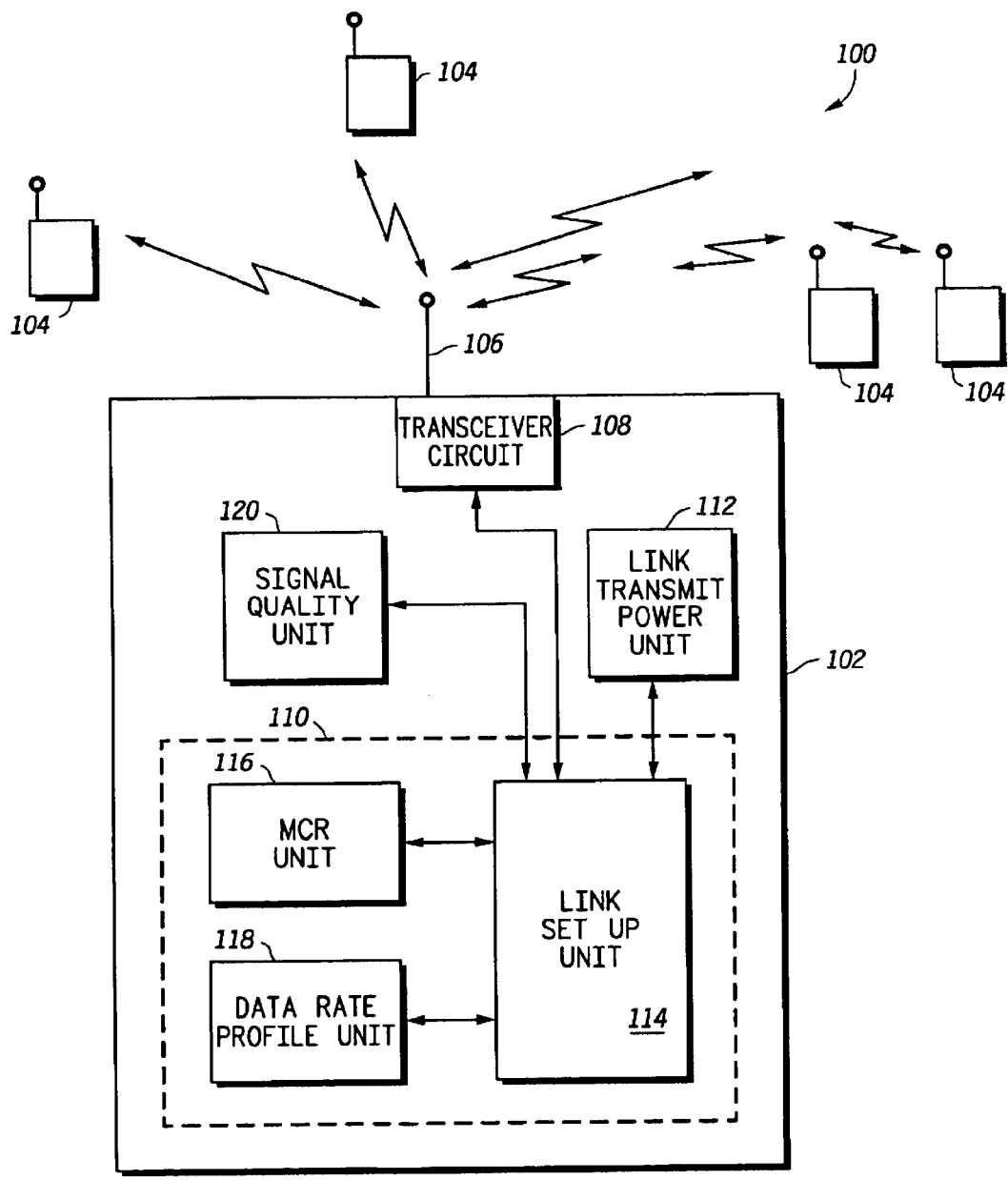
FIG. 1 is a block diagram of a communication system in accordance with the present invention.

In accordance with one aspect of the present invention, a method is provided for transmitting signals in a communication system. The method comprises determining a reference resource size for each of a plurality of planned links in the communication system and determining a desired characteristic for each of the planned links in the communication system, each desired characteristic associated with a minimum resource size. Excess resources are determined based upon the reference resource size and the minimum resource size for each of the planned links. Finally, the excess resources are distributed among the planned links based on a system criterion.

As used herein, a planned link can be either a new link that the system may attempt to establish and serve with some portion of system resources, or an existing link that the system may attempt to serve with some portion of system resources. The system criterion may be any number of performance criteria, such as maximizing system coverage, maximizing system capacity, reducing interference or modifying a modulation/coding rate profile, or data rate profile, of the system. The method may be employed in a wireless communication system which has more than one modulation rate or more than one coding rate. The method may be implemented in CDMA, TDMA and ODFM systems. Additionally, the present invention may be employed in equal data rate systems.

In accordance with another aspect of the present invention, a method for transmitting signals in a wireless communication system includes determining a reference resource size for each of a plurality of planned links in the communication system. A modulation/coding rate is determined for each of the planned links. Each modulation/coding rate is associated with a minimum signal quality, such as a minimum C/I or BER, having an associated minimum resource size. Excess resources, such as excess transmit power, are calculated based upon differences between the reference resource size and the minimum resource size for each of the planned links. The excess resources are then distributed among the planned links based on a system criterion.

In accordance with yet another aspect of the present invention, a system for transmitting signals is provided in a wireless communication system. A resource unit determines a reference resource size for each of a plurality of planned links in the system. A link characteristic unit selects a desired characteristic for each of the planned links. Each desired characteristic has an associated minimum resource size. A link setup system then determines excess resources based upon differences between the reference resource size and the minimum resource size for each of the planned links and distributes the excess resources among the planned links based on a system criterion.

One aspect of the present invention provides an adaptive modulation/coding rate method which improves the use of system resources, such as transmit power, among active links. The system resources may be used to further one or more of any number of system criteria, such as system capacity, system coverage, data rate profile configuration and system interference.

A general communication system 100 having a system 102 for implementing adaptive modulation/coding and resource allocation in accordance with the present invention is shown in FIG. 1. Although the communication system 100 is shown as a wireless communication system, it should be understood that the present invention may be advantageously implemented in any communication system which has limited resources.

The system 102, which is shown as a base station, communicates over radio links with a plurality of mobile units 104. Communications from the system 102 to the mobile units are referred to as downlink communications, and communications from the mobile units 104 to the system are referred to as uplink communications. The system 102 has an antenna 106 and a transceiver circuit 108 for transmitting signals to and receiving signals from the mobile units 104. The communications between the mobile units 104 and the system 102 may be in any desired format, such as code division multiple access (CDMA), time division multiple access (TDMA), frequency division multiple access (FDMA) or any combination of these formats.

A link setup system 110 adaptively controls resource allocation to the links with the individual mobile units 104. In particular, the link setup system 110 may control transmit power allocated to each of the links. The link setup system 110 includes a link resource unit 112 which determines, or calculates, a reference resource size for each planned link in the communication system 100. The resource size may be any of a number of resources in the system, such as transmit power for each link, time slot duration, bandwidth and the like. A link setup unit 114 determines excess resources in the system 102 and distributes the excess resources to the planned links based on a system criterion. A modulation/coding rate (MCR) unit 116 provides modulation/coding rate information for distributing the excess resources based on the MCRs of each of the active links. For purposes of this disclosure, modulation/coding rate, or MCR, will be used to designate one or more modulation techniques, one or more coding rates or any combination thereof. In addition, a plurality of modulation/coding rates encompasses any system with two or more modulation techniques or two or more coding rates. Thus, a system supporting one modulation technique and two coding rates should be considered as having a plurality of MCRs.

A data rate profile unit 118 provides data rate profile information for distributing the excess resources in accordance with a desired data rate profile for the communication system 100. A signal quality unit 120 provides signal quality information for distributing the excess resources based on a characteristic of each of the active links. The operation of each of the elements in the system 102 will now be discussed with reference to various methods in accordance with the present invention to improve the performance of the communication system 100.

It should be understood that resources and resource size are used herein to designate various resources within the communication system 100. These resources may be, for example and not limitation, link transmit power, time slot duration, or bandwidth. In addition, signal quality may be determined by any number of signal characteristics, such as carrier to interference ratio (C/I), bit error rate, word error rate, or carrier to interference, noise and distortion (C/(I+Noise+Distortion)).

Figure 2A:
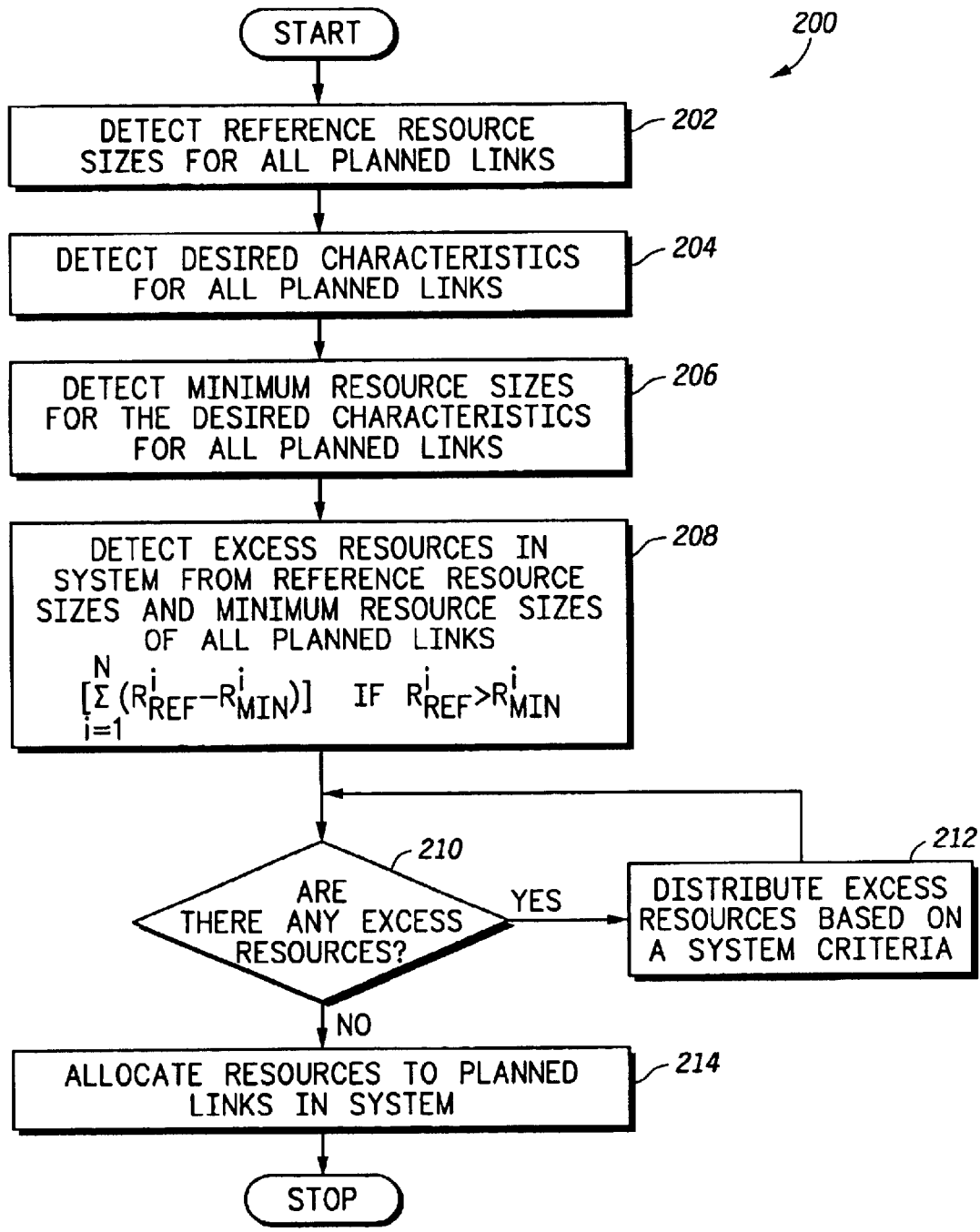
FIG. 2A is a flowchart of a general method in accordance with the present invention in which excess resources are distributed in accordance with a system criterion.

In FIG. 2A, a flowchart illustrates a general method 200 in accordance with the present invention. The method 200 first determines reference resource sizes for all planned links at step 202. Characteristics which are desired for each of the planned links are determined in step 204. In step 206, minimum resource sizes for the desired characteristics for all planned links are determined. Excess resources in the system are determined in step 208 based on the reference resource sizes and minimum resource sizes of all planned links.

In step 210, it is then determined whether any excess resources remain. If so, the excess resources are distributed in step 212 based on a system criterion. If not, the resources are allocated to the planned links in the system in step 214 based on the system criterion.

Figure 2B:
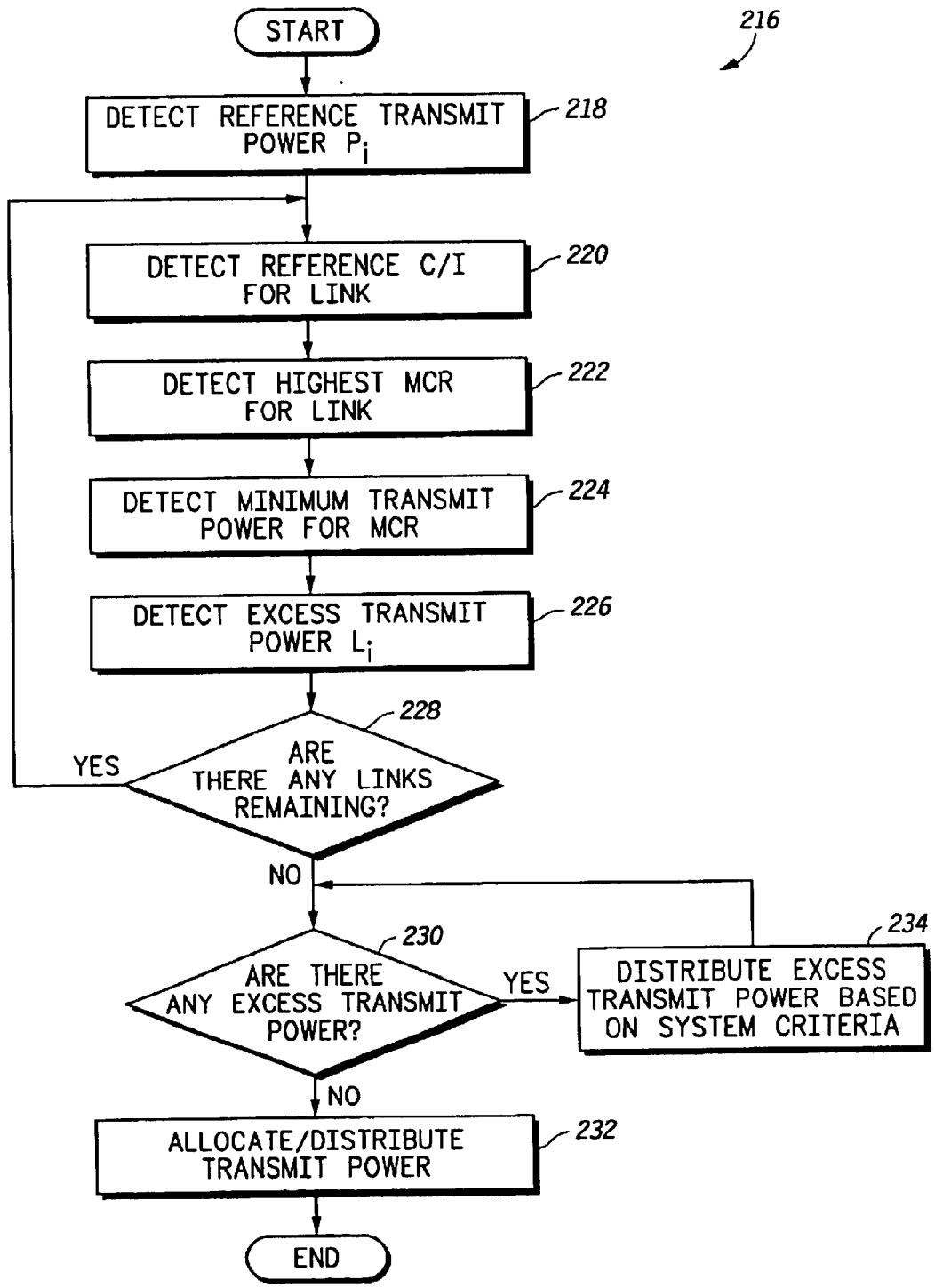
FIG. 2B is a flowchart of a more detailed method in accordance with the present invention in which excess transmit power is distributed in accordance with the system criterion.

In accordance with the present invention, a more detailed method 216 is shown in FIG. 2B for determining excess transmit power and for distributing the excess transmit power based upon one or more system criteria. Although the following description of the method 216 is directed mainly to transmit power and C/I, it should be understood that the present invention is not so limited and may apply to any resource in the system and any signal quality characteristic.

The method 216 first determines a reference resource size, or reference transmit power, for all planned links assuming that each link would be allocated the same transmit power, in step 218. When the method is being applied to the downlink of a communication system, the reference transmit power $P_i$ may be determined by:

$$P_i = \frac{P_T}{N} \quad (1)$$

wherein $P_T$ is a total system transmit power and N is a number of planned links. A reference signal quality, or reference C/I, for each user, $(C/I)_i$ is next determined assuming a link transmit power of Pi at step 220. A MCR which is selected from a set of discrete rates is then determined for each user at step 222. In particular, the MCR having the highest value (from the set) which can be supported by each user's reference C/I is selected. A rate index j of the highest MCR that can be supported by each user's reference C/I may also be determined.

As an example, a discrete set of MCRs that could be used in a system are given in Table 1. In this example, there are 6 discrete rates or MCRs, each with an associated modulation format, code rate, and rate index j. The rate index is an integer greater than or equal to 1, where the minimum MCR is assigned rate index 1, the next larger MCR is assigned rate index 2, and so forth. The total number of MCRs is denoted as J. Note that each MCR is obtained from the combination of the modulation format and the coding rate. In the present invention, each MCR has an associated minimum signal quality that is necessary to support the particular MCR. For example, if the signal quality is specified as a carrier to interference (C/I) ratio, then $\phi_j$ denotes the minimum required C/I to support the MCR with rate index j. In this case, the $i^{th}$ link can be assigned the MCR with rate index j if $\phi_j \leq (C/I)_i < \phi_{j+1}$.

TABLE 1

Example set of discrete modulation/coding rates (MCRs).

| Rate Index j (or MCR index) | Modulation Format | Code Rate | Information Bits/Symbol, or MCR |
|---|---|---|---|
| 1 | QPSK | 3/16 | 0.375 |
| 2 | QPSK | 3/8 | 0.75 |

TABLE 1-continued

Example set of discrete modulation/coding rates (MCRs).

| Rate Index j (or MCR index) | Modulation Format | Code Rate | Information Bits/Symbol, or MCR |
|---|---|---|---|
| 3 | QPSK | 3/4 | 1.5 |
| 4 | 16-QAM | 3/4 | 3 |
| 5 | 64-QAM | 3/4 | 4.5 |
| 6 | 64-QAM | Uncoded | 6 |

For each user, or link, a minimum resource size, or minimum transmit power $P_{i,min}$ needed to achieve a minimum C/I for each user's rate index j is determined in step 224. In this case, user i needs a minimum transmit power of:

$$P_{i,min} = \frac{P_T}{N} \frac{\phi_j}{(C/I)_i} \qquad (2)$$

to support rate index j, where $\phi_j$ is the lowest C/I which can support rate index j. If the user's reference C/I is below the lowest C/I needed to support the minimum MCR in the set (i.e., (C/I); <$\phi_1$), then the minimum transmit power $P_{i,min}$ for that user may be set to zero.

At step 226, an excess transmit power $L_i$ is calculated for each user and the system as a whole. The excess transmit power $L_i$ is determined for each user by assuming a power allocation to the ith user of its corresponding minimum transmit power $P_{i,min}$. The excess transmit power $L_i$ is then calculated as the difference between the reference transmit power $P_i$ and the minimum transmit power $P_{i,min}$ of each user.

The excess transmit power $L_i$ of a single user i is given by equation (3), $$L_i = \frac{P_T}{N}\left(1 - \frac{\phi_j}{(C/I)_i}\right), \qquad (3)$$

or if the user is not given coverage, the excess transmit power $L_i$ is given by $L_i = P_T/N$.

Step 228 returns the method to step 220, until all the N planned links have been analyzed. It is then determined whether any excess transmit power remains in step 230. If there is no excess transmit power remaining, in step 232 the process allocates or distributes the transmit power. If there is excess transmit power available, at step 234 the excess transmit power is distributed among the planned links based on a system criterion. The excess transmit power may be distributed to specific users to increase their C/I's, which may thereby increase their assigned MCRs in an attempt to meet some specified system criterion. The total excess transmit power PXs from all users is given by:

$$P_{XS} = \sum_{i=1}^{N} L_i = P_T\left[1 - \sum_{i=(C/I)_i \geq \phi_i} \frac{1}{N} \frac{\phi_j}{(C/I)_i}\right]. \qquad (4)$$

To increase user i from rate index j to rate index j+1 would require an amount of additional link transmit power $\Delta P_{j,j+1}^i$ given by:

$$\Delta P_{j,j+1}^i = \frac{P_T}{N} \frac{(\phi_{j+1} - \phi_j)}{(C/I)_i} \qquad (5)$$

to be added to the minimum transmit power $P_{i,min}$ already assumed for user i. For the special case of (C/I)$_i$<$\phi_1$ the amount of additional link transmit power needed to bring the user to the minimum supported MCR would be given by:

$$\Delta P_{0,1}^i = \frac{P_T}{N} \frac{\phi_1}{(C/I)_i}. \qquad (6)$$

The excess transmit power $P_{XS}$ can be distributed to meet many different system criteria, or requirements. For instance, the system operator may wish to maximize the system capacity, which will require a different power distribution than an attempt to maximize system coverage. Some system criteria which will be considered, as examples, in accordance with the present invention are coverage, capacity, interference reduction and data rate profile.

One system criterion for which the excess transmit power PXs may be distributed is to alter, or modify the data rate profile, or MCR profile of the system. Under this system criterion, the distribution of the excess transmit power Pxs may attempt to make the MCR profile of the system meet certain requirements. The MCR profile is a representation of the distribution of MCRs in the system which shows the number of users assigned each of the MCRs supported by the system. A system operator may, for example, want to assign specified percentages of users (or classes of users with different grades of service) to each MCR.

As will be appreciated by those skilled in the art, the desired and actual data rate profiles of a particular system will dictate which procedure should be implemented. However, those skilled in the art will readily be able to adapt the method in accordance with the present invention to any such system with the aid of this disclosure.

Generally, the MCR with the largest difference between the desired and actual percentages of users will be addressed first. The distribution may be based on the excess resources in the system or on the entire system resource budget. After distribution, any additional excess resources still available may be distributed based on one or more other, or secondary, system criteria.

Figure 3:
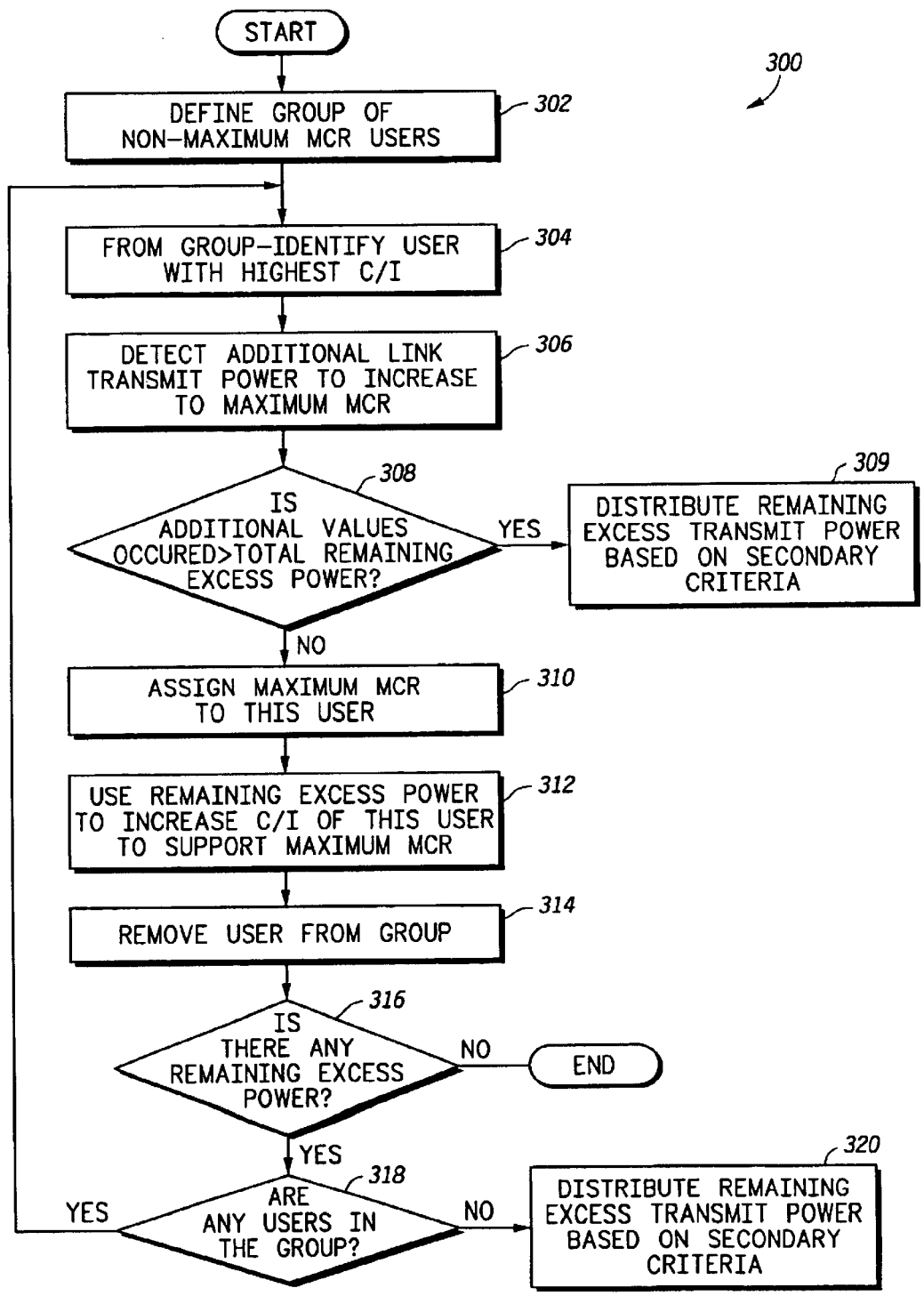
FIG. 3 is a flowchart of a method in which the excess transmit power is distributed to provide a maximum number of users with a maximum modulation/coding rate (MCR) in accordance with an aspect of the present invention.

Referring now to FIG. 3, a flowchart 300 illustrates a method for distributing the excess resources to assign the maximum MCR to as many users as possible. This method may be used in step 218 as described above with reference to FIG. 2 to distribute the excess resources based on assigning the maximum MCR to the maximum number of users. The following steps are performed to distribute the total excess transmit power $P_{XS}$:

1. In step 302, a group of non-maximum MCR users is defined for all users that were assigned a MCR below the maximum available MCR.
2. The user in the non-maximum MCR group is then identified which had the highest reference signal quality, or C/I, in step 304.
3. The additional link transmit power necessary to increase the identified user's signal quality so that it is adequate to support the highest MCR is determined in step 306.
4. It is then determined whether the needed additional power is greater than the remaining excess transmit power at step 308. If the needed additional power is greater than the remaining excess transmit power, the process proceeds to step 309 where the remaining excess transmit power is distributed based on one or more secondary system criteria.
5. If the needed additional power is less than the remaining excess transmit power, then the highest MCR is assigned, at step 310, to this user and the transmit power allocated to this user is adjusted so that the signal quality after allocation supports the highest MCR in step 312.
6. This user is then removed from the non-maximum MCR group in step 314.

7. At step 316, it is determined whether there is any remaining excess transmit power and, if not, the method ends.

8. If there is remaining excess transmit power, in step 318 it is determined whether there are any more users having a non-maximum MCR. If no, the remaining excess transmit power is distributed based on one or more secondary system criteria at step 320. If yes, the method returns to step 304 and repeats steps 304-318 until either the excess transmit power has been depleted, all users are assigned the maximum MCR or no more users can be assigned the maximum MCR.

Under this method there may be some remaining transmit power, even if there are some users that are not assigned the maximum MCR. In step 308, the needed additional link transmit power may be more than the remaining excess transmit power, such as when the remaining excess transmit power is not enough to increase any of the non-maximum users to the maximum MCR, or more particularly, to the signal quality, or C/I, required to support the maximum MCR. However, there may be enough remaining excess transmit power to increase some users to the next highest MCR. In this case, the remaining excess transmit power can be distributed to meet another secondary system criterion, such as increased coverage or increased capacity, as discussed more fully below.

Figure 4:
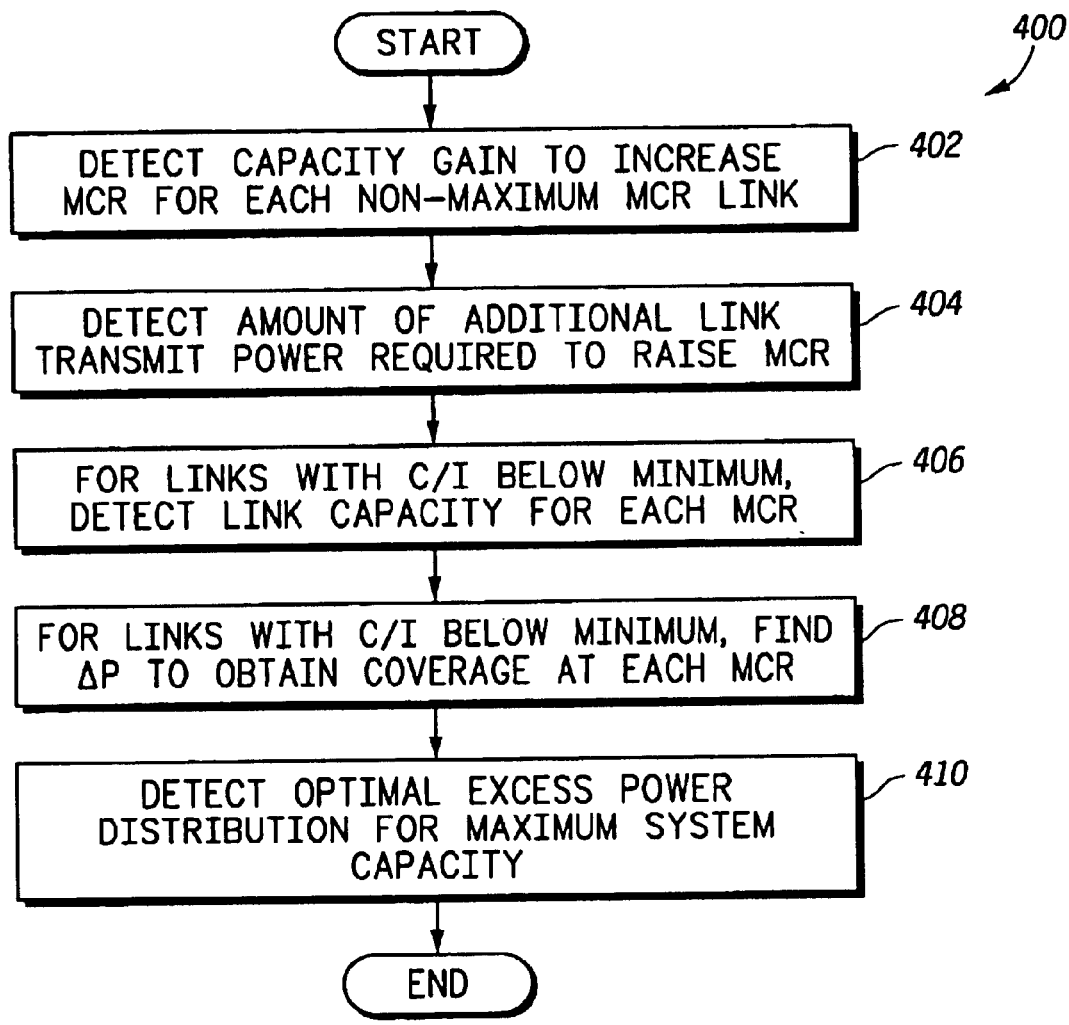
FIG. 4 is a flowchart of a method in which the excess transmit power is distributed to increase system capacity in accordance with the present invention.

In accordance with the present invention and with reference to FIG. 4, a method 400 is provided in which the excess resources, or excess transmit power, may be distributed to improve the system capacity. For practical adaptive modulation/coding, an example model of the capacity of a single link is:

$$\eta_i = \frac{1}{N} \log_2(1 + \alpha\phi_j) \quad (7)$$

where, $\eta_i$ is the $i^{th}$ link capacity in bits/s/Hz, $\phi_j \leq (C/I)_i < \phi_{j+1}$ and is the index corresponding to the discrete MCR assigned to the link. Equation (7) is derived from the Shannon limit equation modified so that the bandwidth is normalized to 1 Hz, signal to noise ratio is replaced with C/I, a degradation factor is introduced, and the fact that the total capacity is spread over N planned links is accounted for. The degradation term a is less than or equal to one and degrades performance by 10 log[1/α] dB compared to the ideal Shannon limit. The value of the degradation term a may be chosen to approximate the performance of practical MCR methods and to model the effects of fast fading on the link performance. Equation (7) also assumes a normalized signaling efficiency of 1 symbol/s/Hz, which is shared among the N planned links.

If a link is given enough additional link transmit power to increase its reference $(C/I)_i$ so that a MCR with rate index j+1 can be used, delta gain Δη in the capacity of the link can be determined by:

$$\Delta\eta^i_{j,j+1} = \frac{1}{N} \log_2\left(\frac{1+\alpha\phi_{j+1}}{1+\alpha\phi_j}\right). \quad (8)$$

Note that this delta gain Δη is independent of the reference $(C/I)_i$ of the link. The additional, or delta, link transmit power ΔP needed to increase the (C/I) of this link is given by:

$$\Delta P^i_{j,j+1} = \frac{P_T}{N} \frac{(\phi_{j+1} - \phi_j)}{(C/I)_i}. \quad (9)$$

Thus, if two links are assigned the same MCR, then increasing the MCR of a link with a larger reference $(C/I)_i$ uses less additional link transmit power than increasing the MCR of a link with a smaller reference $(C/I)_i$, although both links provide the same gain in system capacity. Therefore, the method 400 in accordance with one aspect of the present invention distributes the excess transmit power in such a way that for a given amount of excess transmit power, the maximum system capacity gain is achieved.

The excess transmit power distribution for maximum gain in system capacity is dependent upon the MCRs used in the system, their respective C/I thresholds, and the qualities of the links. This method may be used in step 218 as described above with reference to FIG. 2 to distribute the excess transmit power based on increasing system capacity. The following steps are performed to distribute the excess transmit power:

1. For each link i that is assigned a MCR below the maximum MCR (i.e. a MCR with rate index j<J, where J is a maximum MCR index), a capacity gain that would result from increasing the MCR assigned to the link i to any higher MCR is found in step 402. For each link i with $\phi_j < (C/I)_i < \phi_{j+1}$, the following values are found:

$$\Delta\eta^i_{j,j+k} = \frac{1}{N} \log_2\left(\frac{1+\alpha\phi_{j+k}}{1+\alpha\phi_j}\right) \text{ for all } k \in [1, J-j]. \quad (10)$$

2. For each link i that is assigned a MCR below the maximum MCR, an amount of additional link transmit power needed to increase the assigned MCR to any higher MCR is determined in step 404. This means finding a delta, or additional, link transmit power ΔP, given by:

$$\Delta P^i_{j,j+k} = \frac{P_T}{N} \frac{(\phi_{j+k} - \phi_j)}{(C/I)_i} \text{ for each link and for all} \quad (11)$$

$k \in [1, J-j]$.

3. In step 406, for each link i having a reference C/I below that of the minimum MCR, the link capacity is determined if that link is given coverage at each MCR with index k by:

$$\Delta\eta^i_{0,k} = \frac{1}{N} \log_2(1 + \alpha\phi_k) \text{ for } k \in [1, J]. \quad (12)$$

4. For each link i having a reference C/I below that of the minimum MCR, in step 408, a delta, or additional, link transmit power ΔP is determined as the power needed by that link to attain coverage at a MCR with index k by:

$$\Delta P^i_{0,k} = \frac{P_T}{N} \frac{\phi_k}{(C/I)_i} \text{ for } k \in [1, J]. \quad (13)$$

5. In step 410, an optimal power distribution that maximizes system capacity $$\sum_{i=1}^{M} \Delta\eta^i_{j,j+k}$$

subject to the constraint that $$P_{XS} - \sum_{i=1}^{M} \Delta P^i_{j,j+k} \geq 0$$

is determined where M is the number of links to which additional link transmit power is distributed, and i is indexed over those M links.

Figure 5A:
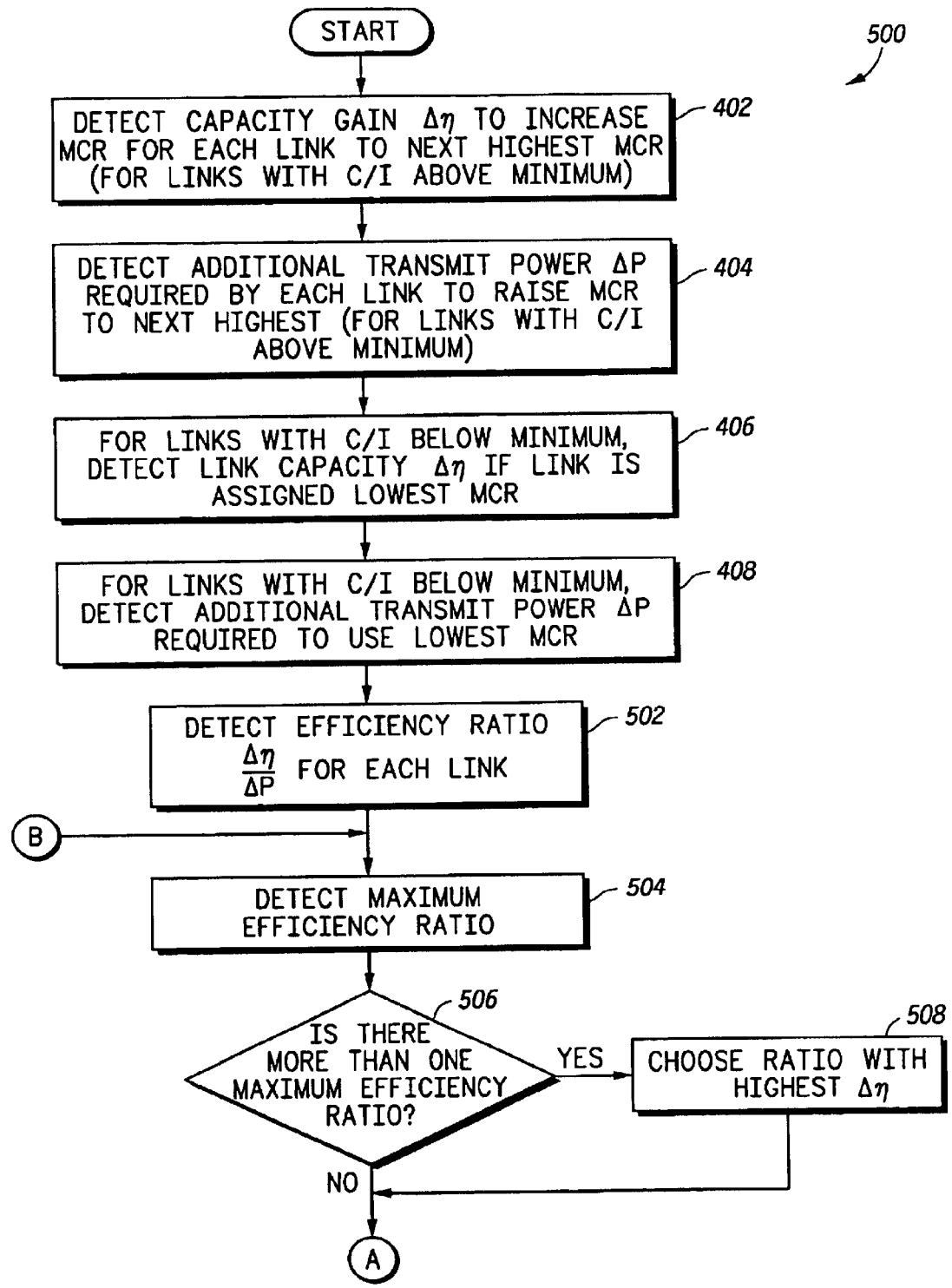
FIGS. 5A and 5B show a flowchart of a method in accordance with the present invention which increases system capacity using efficiency ratios of the users.
Figure 5B:
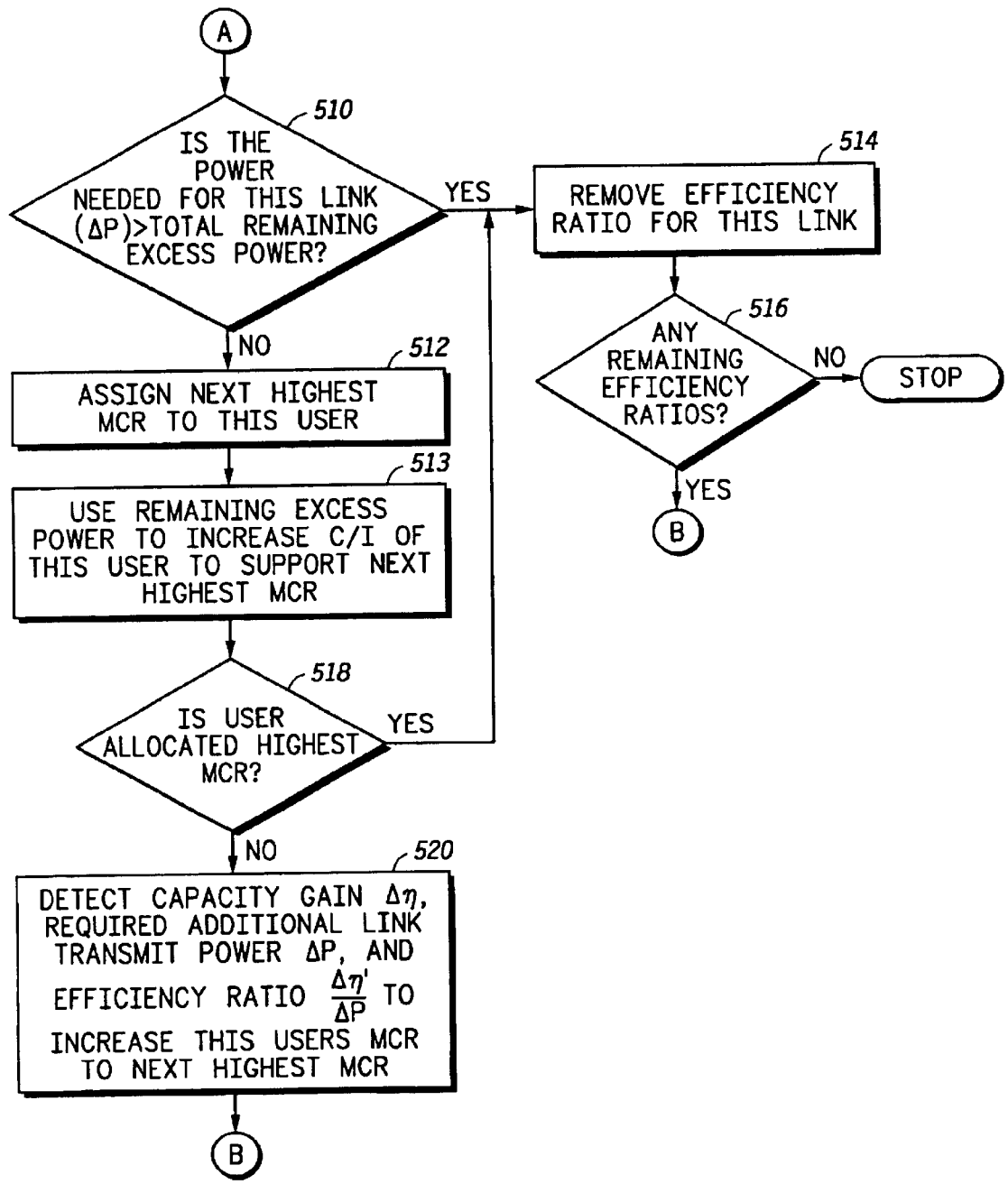

In accordance with another aspect of the present invention, a method 500 is shown in FIGS. 5A and 5B for increasing system capacity, which approximates the optimum system capacity found using the method 400. This simplified method 500 comprises the steps of:

1. Follow steps 402–408 above for the method 400, and shown again in FIG. 5A with the variable k set to 1, to determine the increase in link capacity that would result from increasing the MCR of each link i to the next highest MCR, and the additional link transmit power that would be needed in each case. This means finding a delta gain $\Delta\eta^i_{j,j+1}$ and a delta transmit power $\Delta\eta^i_{j,j+1}$ for each link i which has coverage, and a delta gain $\Delta\eta^i_{j,j+1}$ and a delta transmit power $\Delta P^i_{0,1}$ for each link that does not have coverage. Since only increases to the next highest MCR are considered in this method, for clarity the subscripts may be dropped and the capacity increase is thus designated by $\Delta\eta^i$ and the transmit power increase may be denoted by $\Delta\eta^i$.
2. In step 502, efficiency ratios are determined for all links i. The efficiency ratio is defined as the ratio of link capacity increase to transmit power increase for each link i, or $\Delta\eta^i/\Delta P^i$.
3. A maximum efficiency ratio, as determined by:

$$\frac{\Delta\eta^i_{max}}{\Delta P^i_{max}} = \max_{i \in [1,N]} \left(\frac{\Delta\eta^i}{\Delta P^i}\right) \quad (14)$$

is found in step 504. If there is more than one maximum efficiency ratio in step 506, then the one having the highest link capacity increase $\Delta\eta^i$ is chosen in step 508.
4. In step 510, if the delta power $\Delta P^i$ in this maximum efficiency ratio is less than or equal to the total excess transmit power $P_{XS}$, then assign the next highest MCR in step 512 to that link and allocate the additional link transmit power $\Delta P^i$ to this link (above the link's reference transmit power) to increase the MCR in step 513. Thus, if the link has a reference MCR with rate index j, it is increased to a MCR with rate index j+1, and if the link has a reference C/I below that of the minimum MCR then it is allocated an MCR with rate index 1 at step 512.
5. In step 510, if the delta power $\Delta P^i$ is greater than the total excess transmit power then the efficiency ratio for that link is removed at step 514. In step 516, it is determined whether there are any efficiency ratios remaining. If not, the process is stopped. If so, the process returns to step 504.
6. If the link that was just given the higher MCR in steps 512 and 513 is now at the maximum MCR in step 518, then remove the efficiency ratio corresponding to that link in step 514. Otherwise, assuming that the link now has the additional transmit power assigned to it along with its reference transmit power and that it now uses a MCR with an index of j+1, find a new efficiency ratio for an increase in MCR to the next highest MCR in step 520. For example, if link i was just moved from the MCR with rate index j to the MCR with rate index j+1, then the new efficiency ratio would be:

$$\Delta\eta^i/\Delta P^i = \Delta\eta^i_{j+1,j+2} \quad (15)$$

Replace the original efficiency ratio for this link with the new efficiency ratio.
6. Return to step 504 and repeat steps 504–520 until either no efficiency ratios remain (i.e. all links have been given a higher MCR) or the remaining power is too small to allocate.

Figure 6:
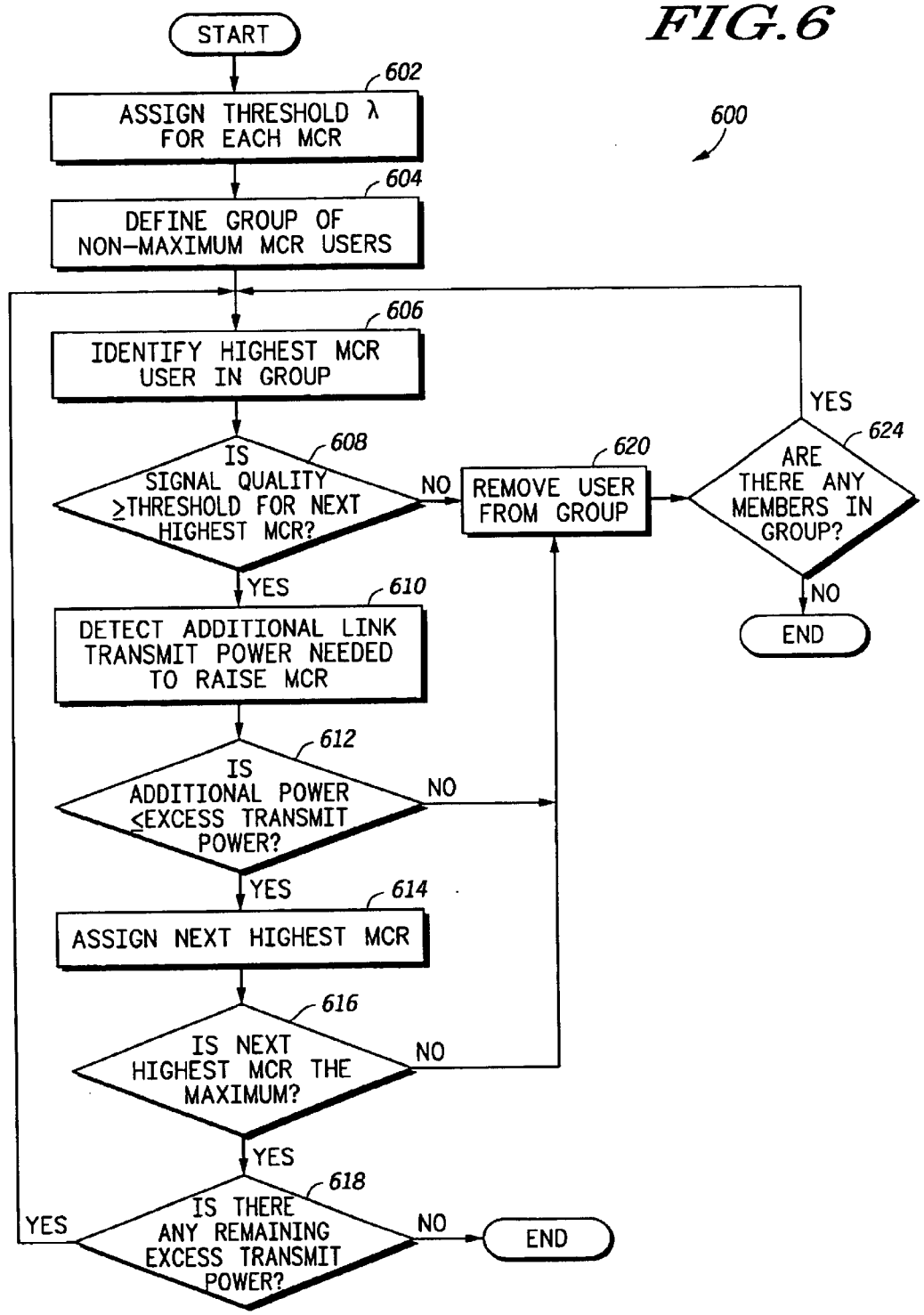
FIG. 6 is a flowchart of a method in accordance with the present invention in which the excess transmit power is distributed to those users having desired characteristics above specified thresholds.

Another method 600 in accordance with the present invention is to distribute power to those users whose desired characteristics are above specified thresholds (assigned to each MCR), as shown in FIG. 6. The excess transmit power is allocated to increase the MCR of those users who do not need as much total power to achieve a higher MCR. This method may be used in step 218 as described above with reference to FIG. 2 to distribute the excess resources based on increasing system capacity. The method of power distribution is as follows:

1. In step 602, thresholds $\lambda$ are assigned for each MCR with index j, where $\phi_{j-1} \leq \lambda_j < \phi_j$.
2. A group of non-maximum MCR users is determined which includes all users that were assigned a MCR below the maximum MCR in step 604.
3. In step 606, a user in the non-maximum MCR group with the highest reference signal quality, or C/I, is identified.
4. In step 608, it is determined whether the user's signal quality, such as its C/I, is above or equal to the threshold $\lambda_{j+1}$ specified for the next highest MCR.
5. If the signal quality of the user is less than the threshold $\lambda_{j+1}$, the user is removed from the group at step 620 and it is determined whether any users are still in the group at step 624.
6. If the user's C/I is above the threshold $\lambda_{j+1}$, the additional link transmit power necessary to increase the C/I so that it is adequate to support the next highest MCR is determined at step 610.
7. If the needed additional transmit power is less than or equal to the remaining excess power, the next highest MCR is assigned to this user in steps 612 and 614. The power assigned is also adjusted so that the C/I after assignment meets the next highest MCR requirement. If the next highest MCR is not the maximum MCR in step 616 and there is excess transmit power remaining at step 618, then steps 606–616 are repeated for the same user with the new C/I and threshold $\lambda_{j+2}$ for the next highest MCR (above the MCR just assigned). If there is no excess transmit power remaining at step 618, the method ends.
8. If the user is at the maximum MCR in step 616, the user is removed from the non-maximum group in step 620. It is then determined whether there are any members remaining in the non-maximum MCR group at step 624. If no members remain, the method 600 ends and any remaining excess transmit power may be distributed based on one or more secondary system criteria.
9. If the needed additional transmit power in step 612 was greater than the excess transmit power, the user is removed from the group at step 620.

The thresholds $\lambda$ for the method 600 can be set to attain specific system capacity and performance goals. With this method 600, users whose radio link conditions are such that they would require a large amount of the excess power to increase their signal quality to the next highest MCR may not be given the excess power. Instead, the excess power may be divided among those users who do not need large amounts to increase to the next highest MCR. In this case, a large amount of the excess power is not expended on a single user; instead the excess power is more evenly distributed.

In accordance with another aspect of the present invention, a method is provided in which excess resources are distributed among active links to improve system coverage. With prior adaptive modulation/coding methods, the users whose signal qualities are below the signal quality required for the minimum MCR will be denied service (or equivalently obtain a data rate of 0). In the present invention, any excess transmit power can be distributed to the users who were denied service, to increase their signal quality so that they can be assigned a MCR. Preferably, the present invention seeks first to increase coverage by attempting to serve as many users as possible who would otherwise be denied service in prior systems.

A target coverage may be selected for the system. Excess transmit power is first distributed to meet the target coverage. If the target coverage is achieved, any remaining transmit power can be assigned to meet other system criteria or performance objectives.

Figure 7:
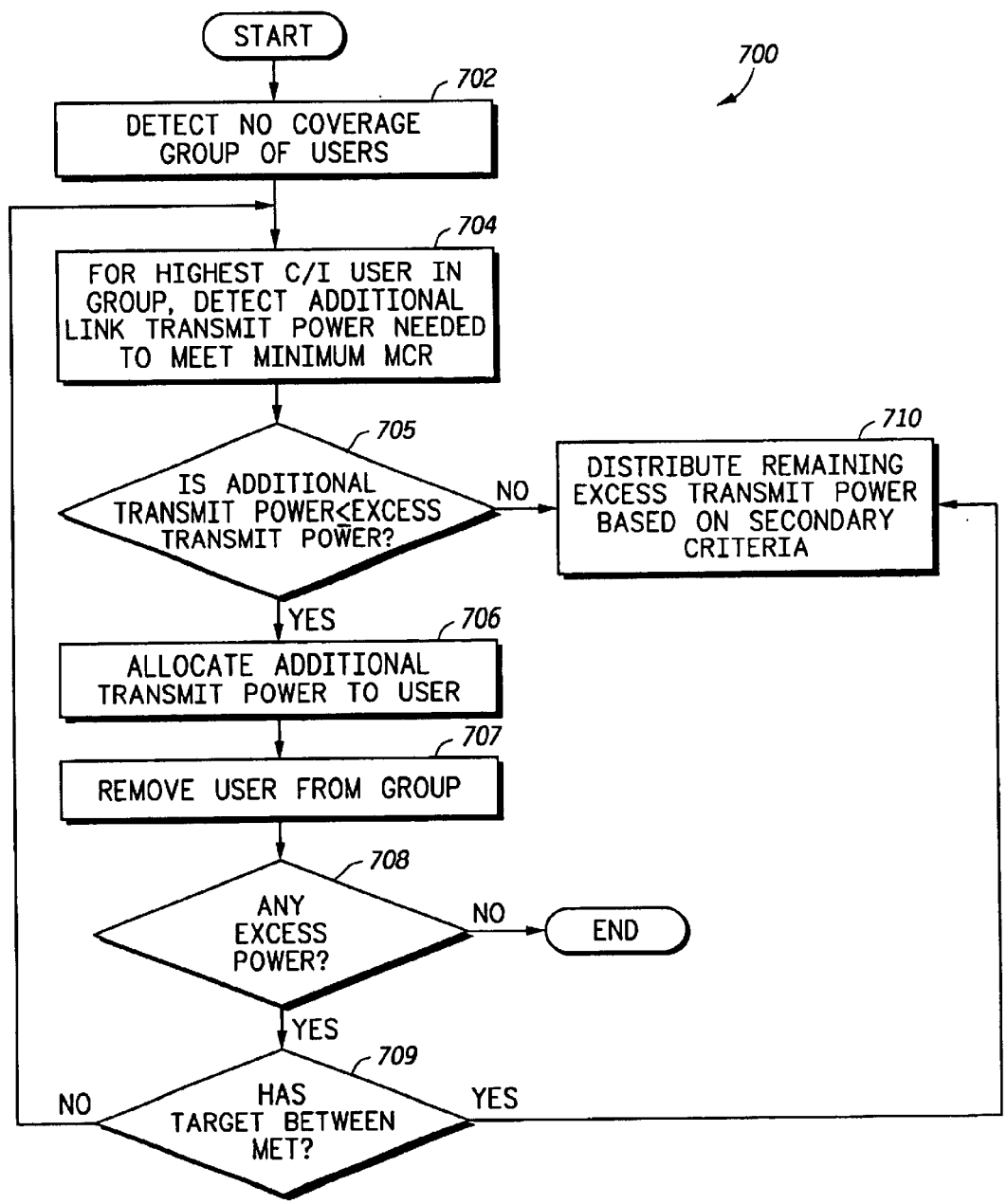
FIG. 7 is a flowchart of a method in accordance with the present invention in which the excess transmit power is distributed to increase system coverage.

With reference to FIG. 7, a method 700 in accordance with the present invention distributes excess resources to maximize system coverage. This method 700 may be used in step 218 as described above with reference to FIG. 2 to distribute the excess resources, or excess transmit power, based on increasing system coverage. The method 700 comprises the steps of:

1. Defining a group of "no coverage" users consisting of the users whose reference C/I's were so low that they were denied coverage (had a data rate of zero) in step 702.
2. Starting with the user that had the highest reference C/I in this group, determine the additional link transmit power needed to meet the minimum C/I of the minimum MCR in step 704.
3. If the needed additional transmit power is greater than the remaining excess transmit power in step 705, then distribute the excess transmit power according to a secondary system criterion in step 710.
4. If the needed additional transmit power is less than the remaining excess transmit power in step 705, then allocate the needed additional transmit power to this user in step 706.
5. Remove the user from the no coverage group in step 707.
6. In step 708, if there is any remaining power then repeat steps 704–708 until either the excess transmit power has been depleted or the target coverage has been achieved in step 709. Those skilled in the art will readily comprehend that to achieve 100% coverage, the power distribution process must remove all users from the group.
7. Distribute, in step 710, any remaining excess transmit power to meet one or more secondary system criteria.

If the method 700 is able to provide 100% coverage and still has remaining excess transmit power, different methods may be used to distribute the remaining excess transmit power, in order to meet secondary system criteria, or performance objectives. For example, a secondary goal may be to increase system capacity, or it may be to increase the number of users with the highest MCR. In each of these cases, the remaining excess power (after distribution to increase coverage) may be distributed according to the methods described herein.

In accordance with yet another aspect of the present invention, a method is provided which distributes excess resources to reduce system interference. This method may be used in step 218 as described above with reference to FIG. 2 to distribute the excess transmit power based on reducing system interference. The method comprises the step of not transmitting any excess transmit power. This decreases the total power transmitted in a cell, which in turn decreases the interference from that cell in other cells.

If interference reduction is the primary system criterion, then this method is applied in step 218. This method may also be applied after an initial power distribution, and rather than distributing any remaining excess transmit power according to some other secondary criterion, the excess transmit power may be simply not transmitted. For many of the other power distribution methods described herein, there may be additional excess transmit power available after the primary system criterion has been achieved and interference reduction may be used as a secondary system criterion.

Figure 8:
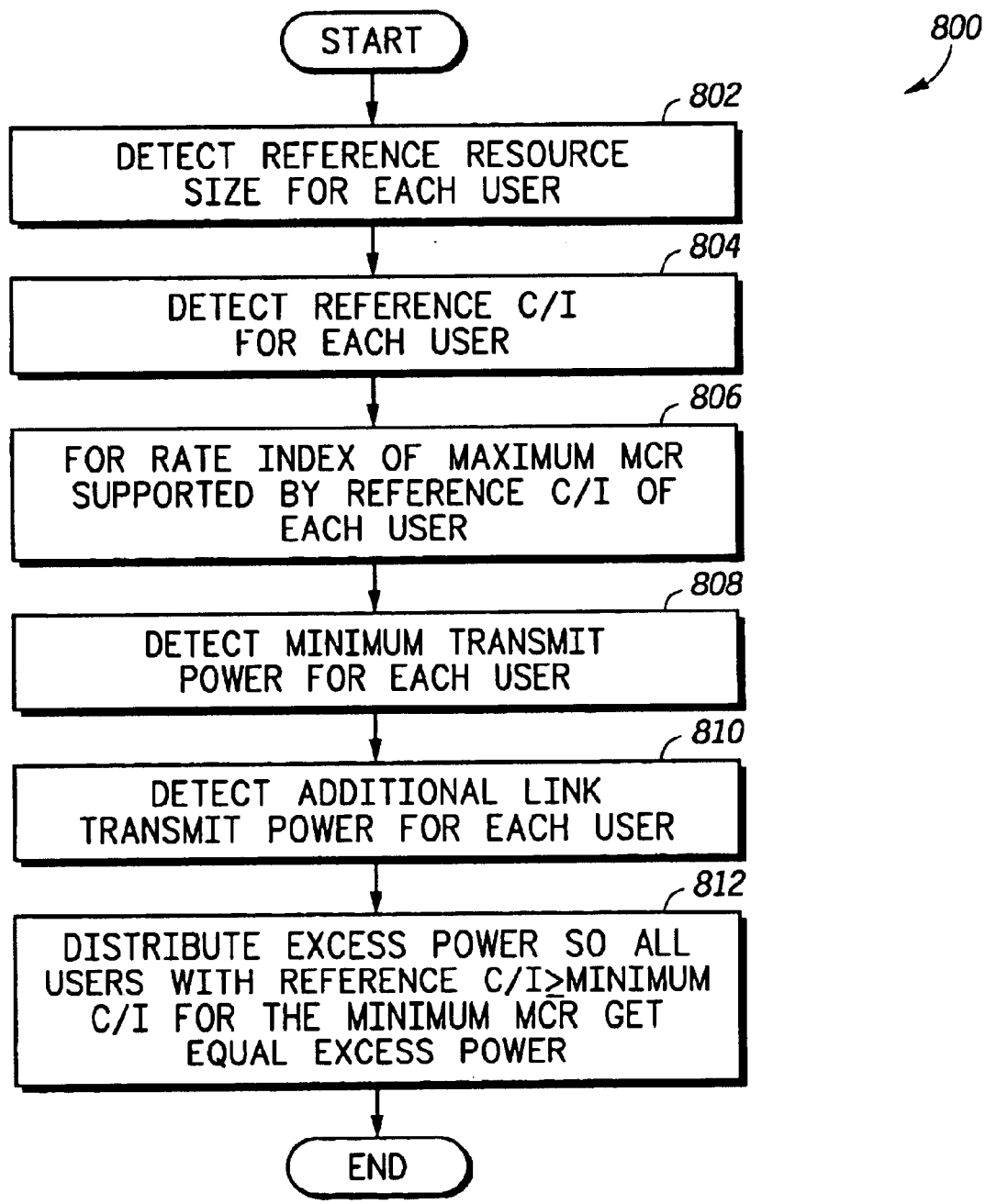
FIG. 8 is a flowchart of a method in accordance with the present invention in which the excess transmit power is fairly distributed among the links.

In accordance with another aspect of the present invention, a method for distributing excess resources to achieve a fair excess power distribution is provided. Referring now to FIG. 8, a method 800 is illustrated for fairly distributing excess resources.

1. In step 802, determine a reference resource size, such as reference transmit power, for each active link, or user, such that each link is assigned the same reference transmit power $P_i = P_T/N$, where $P_T$ is the total system transmit power and N is the number of planned links.
2. In step 804, determine a reference signal quality, such as a reference C/I for each user.
3. In step 806, determine the rate index j of the maximum MCR that can be supported by the reference C/I of each user.
4. Determine a minimum transmit power for the user. The minimum transmit power $P_{i,min}$ is zero for those users denied coverage and $P_T/N$ for those with coverage at step 808.
5. Determine excess transmit power $L_i$ for each user as the difference between the reference transmit power and the minimum transmit power in step 810. For a single user, the excess transmit power is given by $L_i = P_T/N$ for a user who is denied coverage, and $L_i = 0$ for any other user.
6. In step 812, distribute the excess transmit power so that all users which have coverage are given equal amounts of the excess transmit power.

As will be readily apparent to those skilled in the art, this method 800 distributes the excess transmit power fairly among those users with coverage but may not maximize system capacity or coverage.

The present invention may also be implemented in communication systems which provide an equal data rate for all users. Standard adaptive modulation/coding methods give different MCRs to users with different signal qualities, whereas adaptive power allocation methods give the same data rate to each user. In accordance with the present invention, a method is provided which provides equal data rates to all users in a system with adaptive modulation/coding, even though different users may have different MCRs.

For the equal data rate adaptive modulation/coding method, the system time resource is divided into frames with N non-overlapping time slots. Each time slot is typically assigned to a different user. The frame length is fixed, but the lengths of the N time slots can be different. In order to satisfy the equal data rate constraint, a user's time slot length is made inversely proportional to the MCR assigned to the user. For example, a user with a modulation/coding rate of 1 b/s/Hz will have a slot duration that is twice as long as a user with a modulation/coding rate of 2 b/s/Hz. The time slot length for each user can be defined as:

$$T_i = \frac{\rho}{b_i} \qquad (16)$$

where $b_i$ is the modulation/coding rate for the $i^{th}$ user (in bits per transmitted symbol) and $\rho$ is an unknown constant. The sum of the N time slot durations must be equal to the total frame duration $T_F$:

$$T_F = \sum_{i=1}^{N} T_i = \sum_{i=1}^{N} \frac{\rho}{b_i}. \quad (17)$$

The capacity contributed by the $i^{th}$ user's time slot is simply the total number of bits in the time slot divided by the frame length, all divided by the channel bandwidth. Since the number of bits in the slot is the product of the slot length, symbol rate, and bits per transmitted symbol, the capacity of link i is:

$$\eta_i = \frac{\left(\frac{\rho}{b_i}\right) R_s b_i}{B T_F}. \quad (18)$$

In equation (18), $R_s$ is the symbol rate and B is the signal bandwidth. Moreover, the signaling efficiency $$\frac{R_s}{B}$$

is normalized to a value of 1 symbols/Hz. As a result, the capacity of the $i^{th}$ user's link in equation (18) can be simplified to:

$$\eta_i = \frac{\rho}{T_F}. \quad (19)$$

Now by substituting equation (17) into equation (19), equation (20) is obtained:

$$\eta_i = \frac{\rho}{\sum_{j=1}^{N} \frac{\rho}{b_j}} = \frac{1}{\sum_{j=1}^{N} \frac{1}{b_j}}. \quad (20)$$

Since all N users have the same data rate and capacity contribution, the total system capacity is N times the link capacity of a single user. Moreover, the expression for $b_j$ (bits per symbol) is obtained from a modified Shannon limit expression by omitting the (1/N) leading factor. The final expression for the theoretical capacity of an adaptive modulation/coding system with equal data rates is given by:

$$\eta_{AMC\_EDR} = \frac{N}{\sum_{i=1}^{N} \left(\frac{1}{\log_2[1 + \alpha(C/I)_i]}\right)}. \quad (21)$$

Now a more detailed description of the equal data rate adaptive modulation/coding method will be provided. For the equal data rate adaptive modulation/coding method, the system adjusts the resource size of each planned link in order to achieve a system criterion, namely an equal data rate, or link capacity, on all of the planned links. In this case, the resource size is the time slot duration. The method for the equal data rate adaptive modulation/coding scheme is as follows:

1 Assume that there are N planned links (users), labeled from 1 to N, and that each user is assigned the same reference time slot duration, $$T_{ref} = \frac{T_F}{N}.$$

2. Determine the C/I, denoted $(C/I)_i$, for each of the planned links.
3. Determine the highest MCR (from the set of discrete rates), $b_i$, that can be supported by each user's C/I. In this case, the MCR of each of the planned links is the desired characteristic of each of the planned links.
4. Determine a minimum time slot duration for each user, $$T_i = \frac{\rho}{b_i},$$

where $$\rho = \frac{T_F}{\sum_{j=1}^{N} \frac{1}{b_j}}$$

5. Determine an excess time slot duration for each user according to $T_{XS,i} = (T_{ref} - T_i)$ if $(T_{ref} - T_i) > 0$, or $T_{XS,i} = 0$ if $(T_{ref} - T_i) < 0$ 6. Determine total excess time slot duration as the sum of the individual excess time slot durations.
7. Distribute the total excess time slot duration from users having non-zero excess time slot duration to users having $(T_{ref} - T_i) < 0$ such that each user's time slot duration matches its minimum time slot duration.

Another variation of the present invention where the resource size is time slot duration is to use a system criterion other than equal data rate. The reference time slot duration and excess time slot duration are defined as before, but the minimum time slot duration for each link can be based on the MCR for the link or the grade of service required for the link. For example, the minimum time slot duration for a link could be assigned to either the system minimum time slot duration for the lower MCR or grade of service or the system maximum time slot duration for the higher MCR or grade of service. As described in previous methods, the reference resources from those links with reference time slot durations less than the system minimum time slot duration are considered excess resources. Excess time slot duration can then be distributed to modify the data rate profile, maximize capacity by increasing the time slot duration of the largest MCR links, or reduce interference by not transmitting the excess time slot duration.

When used with a discrete set of MCRs, methods where the resource size is time slot duration will likely have excess resources, or transmit power, available. This excess transmit power can be distributed, for example, to increase the MCRs of some of the users (to increase capacity or coverage). The power/MCR distribution can be done before the equal data rate adaptive/modulation coding method in order to preserve the equal data rate property. Or, the excess transmit power can be distributed after the equal data rate adaptive/modulation coding method if some variation in link data rates is acceptable.

Figure 9:
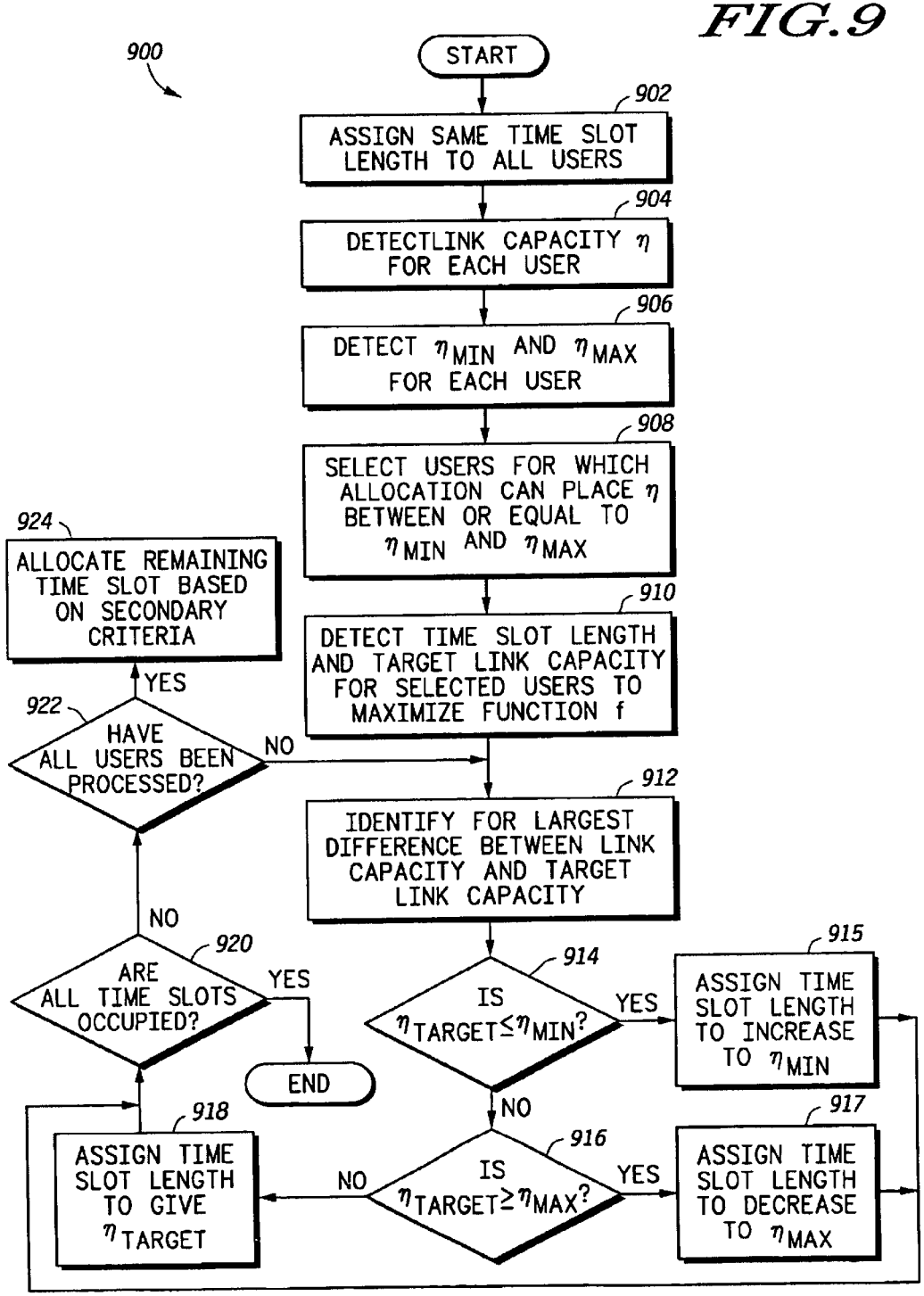
FIG. 9 is a flowchart of a method for an equal data rate system in which a time slot allocation process is implemented in accordance with an aspect of the present invention.

In accordance with another aspect of the present invention, a method of providing adaptive MCR with a range of desired data rates is provided which uses excess resources of the system to assure that each link is within a target link capacity zone. Assume that for each link, a set of possible capacities per link is allowed, bounded by a minimum link capacity $\eta_{min}$ and a maximum link capacity $\eta_{max}$. The objective is to maximize a function $f$ over the whole set of users. Referring now to FIG. 9, a method 900 in accor dance with the present invention using a time slot allocation process is described as follows:

1. Each user is assigned the same reference time slot length in step 902.
2. The capacity η of each link is determined using any appropriate method in step 904.
3. In step 906, the minimum capacity $\eta_{min}$ and the maximum capacity $\eta_{max}$ are determined.
4. For each user, it is determined in step 908 whether the time slot allocation method would enable each user to reach $[\eta_{min}; \eta_{max}]$. If a user cannot achieve this range, that user is removed from the method.
5. If a user can reach this range, the time slot length and a target link capacity $\eta_{target}$ for each remaining user is determined in step 910, so that a function $f$ is maximized (note that each user may have a different value of target link capacity $\eta_{target}$).
6. In step 912, the user having the largest difference between its link capacity and its target link capacity $(\eta - \eta_{target})$ who has not been assigned resources is identified.
7. If for that user $\eta_{target} \leq \eta_{min}$, in step 914, the user is assigned a time slot length that will increase its link capacity to the minimum link capacity $\eta_{min}$ at step 915. If $\eta_{target} \geq \eta_{max}$ in step 916, the user is assigned a time slot length that will decrease its link capacity to the maximum link capacity $\eta_{mad}$ at step 917. If $\eta_{min} < \eta < \eta_{mad}$ in step 918, the user is assigned a time slot length that will change its link capacity to the target link capacity $\eta_{target}$.
8. Steps 912–918 are repeated until either all the time slots are occupied at step 920 or all users are served at step 922. If the time slots are not all occupied, then they may be allocated based on one or more secondary system criteria at step 924. Depending on how the target zone is chosen, this method 900 can still achieve an improved system capacity while meeting other system requirements (e.g. maximum coverage reliability).

The present invention is not limited to one time procedures. The present invention may accommodate admission and removal of links and time-varying link quality, due to movement of the users, changes in interference, or changes in the propagation environment. As examples, various methods in accordance with the present invention for accommodating these effects are set forth below.

The admission and removal of links and time-varying link quality may preferably be addressed by periodically re-performing the link adaptation procedure of the present invention. For example, link adaptation may be performed once every frame in a TDMA or CDMA system. In such a case, the planned links would be determined for each frame (based on the links from the previous frame and any admissions/removals for the current frame) and the link adaptation procedure would be applied as if all of the planned links were new links in the frame. This approach is effective and it provides a very straightforward implementation. A variation on this preferred approach is to use the current power levels, C/Is, and MCRs of the current links as initial values for the next frame in the link adaptation procedure. Link adaptation may also be performed upon removal of a link. A link may be removed when a user either sends a termination call message or hands-off to another cell. When the link is terminated, the resources that were assigned to that link are now excess resources. Depending on the radio resource management procedures used by the network, different solutions for handling this situation are available. For example, the system can re-initialize the power/resource assignments, applying any of the methods previously described. As another alternative, the excess resources can be kept unused to allow the future admission of new users and also reduce system interference. Additionally, the excess resources can be assigned to a user waiting for call admission. If the available excess resources are not assigned to a new user, the resources can be given to another current link or distributed among the current links as previously described (e.g. to increase data rates or system capacity).

The admission of a new user may be performed in accordance with the following procedure. When the network receives an admission request, the system checks if there are free resources available. If yes, different admission policies can be chosen. Compared with the users already active in the cell, the new user can be treated as an equal, having a low priority, having a medium priority or having a high priority.

If the new user has an equal priority, the link adaptation method is re-run on the whole set of planned links. If the new user has a low priority, the system allows the new user only if the new user can get the minimum resource amount, otherwise the access request is denied or delayed. For example, assume that the resource was a spreading code in a CDMA system transmitted with power $P_u$. The available resource can be assigned to a new link without affecting the remaining links if the C/I of the new link, when transmitted with power $P_u$, is large enough for a MCR supported by the system. Also, if the new link only requires a power of $P_r$ which is less than $P_u$, the excess power $(P_u - P_r)$ can be distributed using the methods of the present invention, but using current power levels and MCRs of the links as the initial values.

If new users have a medium priority, the system always allows the new users, assigning them the minimum resource amount. After a given time, they can be treated as equal. This case is of particular interest for hand-off procedures, in order to avoid a forced link removal for an ongoing call. If new users have a high priority, the system always allows the new users and assigns them a specified grade of service. After a given time, they can be treated as equal. This guarantees that a user does not experience a loss of grade of service while in a hand-off procedure. The present invention may also adjust for link quality changes which typically result from movement of the users, changes in interference, or changes in the propagation environment. Several exemplary methods for handling link quality changes in accordance with the present invention will now be provided. In a preferred method, whenever a significant change occurs in one or more of the link qualities, the link adaptation procedure is re-run on the whole set of planned links. As a second method, the initial step of the selected link adaptation procedure is run only once (computation of the signal quality of each user in the case of equally distributed transmission power). Whenever a significant change occurs in one or more of the link qualities, the MCRs are updated, and the excess resources are recalculated and distributed. Since these methods do not accommodate link admissions/removals, they should be combined with the link admission/removal methods or the preferred method in order to provide an effective solution.

Although the operation of the invention has been described in detail primarily for the cases where the system resource size is a transmit power or a time slot duration, the invention can also be used when the resource size is a signal bandwidth. Two types of systems that may benefit from this configuration of the invention are Frequency Division Multiple Access (FMDA) systems and OFDM systems. In an FDMA system, the invention can be used to determine the bandwidth of each of the planned links within a total specified system bandwidth. In an OFDM system which assigns groups of the OFDM subcarriers to different links, the invention can be used determine the number of subcarriers to be assigned to each of the planned links.

Although the use of the invention has been described primarily from the perspective of the downlink of a wireless communication system, the principles of the present invention are equally applicable to the uplink. The main difference between applying the present invention to the downlink and uplink is that the downlink is a one-to-many configuration while the uplink is a many-to-one configuration. As a result, the downlink allocates a portion of the total base station power to each link. However, in the uplink, each user has a separate power amplifier, so the links are not sharing a single "pool" of power, or resources.

Nevertheless, those skilled in the art with the advantage of this disclosure will be able to readily apply the present invention to the uplink configuration. For example, if each user is assumed to be transmitting with the same power, the C/I of each link can be measured at the base station and each link can be assigned an appropriate rate index. After the rate index is assigned, the base station can direct each user to reduce its transmit power to the level that just meets the minimum C/I for the selected MCR. This process would reduce the amount of interference that is propagated into surrounding cells, and may increase system capacity and/or coverage reliability.

Another possible method would be to assign each user a rate index, then to change the transmit power in order to reach the nearest MCR, even if it requires a higher C/I. On average, the level of interference would not change and some users would be assigned a higher MCR. As a consequence, the system capacity should increase.

The methods of the present invention may be advantageously applied to any code division multiple access (CDMA) or time division multiple access (TDMA) system with more than one modulation rate or more than one coding rate, such as evolutions of cdma2000 or Wideband CDMA (WCDMA). In addition, the methods of the present invention can be applied to any fourth generation fixed or mobile broadband wireless system that incorporates Orthogonal Frequency Division Multiplexing (OFDM).

The methods of the present invention may be advantageously applied as frequently as is desired and practical. The communication system may attempt to track short term variations in link, or signal, quality (e.g., short-term fading, such as Rayleigh fading), medium term variations (averaged over short-term fading), or long term variations (averaged over both short-term fading and shadowing). The speed at which the adaptation can occur is determined mostly by the ability to track the variations and to report the variations back to the base station in a timely fashion.

The C/I thresholds for the MCRs may be variable. They may change with packet size, block size, mobile speed, link conditions and the like. To achieve the highest system performance gains from the present invention, these variations should be considered.

As described above, there may be some users who have C/Is which are below the minimum C/I required for the minimum MCR. The system capacity can be increased by denying service to these users, and replacing them with other users who have C/Is which are above the minimum required value. This requires the system to identify additional users with adequate C/I (beyond the original group of N), and assigning channel resources to them if some of the original N users have insufficient C/I's. This channel resource reassignment can be used alone or in combination with any of the other methods. It is preferably performed before applying any of the excess power distribution methods.

When some of the resources (e.g., time slots or codes) are not in use in the cell, the power that would normally be allocated to these resources can be treated as extra available power. This extra power can be allocated to the active links using one of the methods in accordance with the present invention. Alternatively, the unused resources can be assigned to one or more of the active links before applying one of the methods.

The link adaptation methods of the present invention typically attempt to achieve a desired link quality. In order to improve robustness to measurement errors and other transmission characteristics, a tolerance parameter 6 can be introduced into the methods. For example, the tolerance parameter 6 may be introduced in the adaptive modulation/coding method with excess power distribution to provide a tolerance value around a C/I switchpoint. Then excess power will only be distributed from a link if the link's C/I is more than δ from a MCR switchpoint. Moreover, separate tolerance parameters can be used on the high side and low side of a switchpoint (i.e., $\delta^+$ and a $\delta^-$ fir C/I's above and below a switchpoint, respectively).

Different links may have different link degradation factors (using the Shannon Limit as a reference) due to different multipath fading profiles and the like. This means that the same C/I value on two different links may represent two different link qualities. In this case, the link quality difference can be accommodated in various ways. One way, for example, is to calibrate the mapping between link quality and a measured signal quality, such as C/I, for each user. This calibration may be time varying, since propagation conditions can change over time. The methods of the present invention may still be applied as long as valid link, or signal, quality estimates are available. For example, if C/I is measured and calibrated to true signal quality by a mapping from $(C/I)_{measured}$ to $(C/I)_{corrected}$, then $(C/I)_{corrected}$ can be used in the link adaptation methods. In general, the link adaptation methods can be reformulated in terms of whatever signal quality parameter is deemed most appropriate, such as decoded bit error rate, word error rate, C/(I+Noise+Distortion), and the like. Different degradation factors can be used for the different MCR levels to account for unequal modulation implementation losses or channel coding variation.

In CDMA systems, a multipath channel introduces additional "interference" from the non-orthogonality of the time-shifted spreading codes. This can be accommodated in the link adaptation methods by including the power of this extra interference in the C/I values. In this case, attempting to assign all N channel resources (i.e., spreading codes) might not maximize the system capacity because of the extra interference buildup. The methods of the present invention may be reformulated to accommodate operation using only a fraction of the N channel resources. Then the performance can be compared between the full and fractional resource assignment approaches and the best method can be selected on a case-by-case basis.

As noted above, the different methods in accordance with the present invention can be combined when beneficial. Link, or signal, quality can be measured based on a pilot signal, training, or synchronization signal for an idle or active user, or can also be based on measured BER/WER for active users. In addition, the methods of the present invention may be implemented in hardware, such as field programmable gate arrays (FPGAs) or Application Specific Integrated Circuits (ASICS), or in software, such as in digital signal processors, or any combination thereof.

In the previous discussion, it was assumed the link adaptation methods were applied to all the users. However, it is possible that one set of users may have a fixed rate within the system. In this case, the total transmit power is split between the two groups, and the excess power allocation methods can be performed only on the subset of users that are allowed to adapt their links. More generally, it is possible to split the set of users into different subsets, each one using a different link adaptation method.

The new link adaptation methods are applicable when the resource length takes on one of a discrete, finite set of values. The initial resource size and the excess resources distributed may be constrained to some multiple of a system minimum resource size.

The new link adaptation methods of the present invention are also applicable to the case where multiple channel resources (such as multiple codes or multiple time slots) are assigned to a particular user. In this case, the multiple resources can be modeled as being assigned to different users that have identical link qualities for the purpose of using the methods as defined above.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. In a wireless communication system which supports a plurality of modulation/coding rates, a method for transmitting signals comprising the steps of:
   determining a reference resource size for each of a plurality of planned links in the communication system;
   determining a modulation/coding rate for each of the planned links, each modulation/coding rate being associated with a minimum resource size; and
   determining excess resources based upon differences between the reference resource size and the minimum resource size for each of the planned links;
   distributing the excess resources among the planned links based on a system criterion;
   wherein the step of determining a modulation/coding rate comprises the steps of:
   determining the modulation/coding rate for each of the planned links from a predetermined set of modulation/coding rates, the predetermined set including a maximum modulation/coding rate; and
   wherein the step of distributing comprises the step of:
   identifying a non-maximum group of planned links which are not set to the maximum modulation/coding rate;
   identifying one of the planned links in the non-maximum group which has the highest signal quality; and
   distributing the excess resources such that the one of the planned links is modulated at the maximum modulation/coding rate.

2. The method as recited in claim 1 to wherein the resource size is time slot length.

3. The method as recited in claim 1 wherein the resource size is transmit power.

4. The method as recited in claim 1 wherein the system is a code division multiple access system.

5. The method as recited in claim 1 wherein the planned links comprise currently active links and wherein the reference resource size is a resource size currently assigned to the active link.

6. The method as recited in claim 1 wherein the reference resource size is total system resources divided by the number of planned links.

7. The method as recited in claim 1 wherein the step of distributing comprises the step of:
   defining a desired data rate profile; and
   distributing the excess resources to modify the data rate profile in accordance with the desired data rate profile.

8. The method as recited in claim 7 wherein the step of distributing the excess resources comprises the step of:
   modifying the data rate profile to assign to a maximum number of the planned links the maximum modulation/coding rate.

9. The method as recited in claim 1 wherein the step of distributing the excess resources comprises the step of:
   distributing the excess resources to increase system coverage.

10. The method as recited in claim 9 wherein a minimum signal quality is required before signals can be transmitted over the planned links, and wherein the step of distributing the excess resources comprises the steps of:
    determining whether a signal quality for any of the planned links at the reference resource size is less than the minimum signal quality; and
    distributing the excess resources among the planned links with the signal quality less than the minimum signal quality.

11. The method as recited in claim 10 wherein the step of distributing comprises the steps of:
    distributing the excess resources among the planned links with the signal quality less than the minimum signal quality until a number of the planned links are equal to or greater than the minimum signal quality; and
    distributing any remaining excess resources based on one or more additional system criteria.

12. The method as recited in claim 10 wherein the signal quality is based on carrier to interference ratio for each of the planned links.

13. The method as recited in claim 1 wherein the step of distributing the excess resources comprises the step of:
    distributing the excess resources to increase system capacity.

14. The method as recited in claim 13 wherein the step of distributing the excess resources comprises the step of:
    determining a reference modulation/coding rate for each of the planned links;
    determining for each of the planned links additional link transmit power required to increase the reference modulation/coding rate to a higher modulation/coding rate; and
    determining an aggregate of the additional link transmit power which substantially maximizes the system capacity.

15. The method as recited in claim 14 wherein the step of determining an aggregate of the additional link transmit power comprises the steps of:
    determining efficiency ratios of link capacity gains and additional link transmit power values required for increasing the reference modulation/coding rate of each of the planned links to a higher modulation/coding rate; and
    distributing the excess transmit power based on the efficiency ratios to substantially maximize the system capacity.

16. The method as recited in claim 1 wherein the step of distributing the excess resources comprises the step of:

distributing the excess resources to reduce system interference.

17. The method as recited in claim 16 wherein the step of distributing the excess resources comprises the step of:

removing at least a portion of the excess resources.

18. The method as recited in claim 1 wherein the signals are transmitted from a plurality of mobile units.

19. The method as recited in claim 1 wherein the step of distributing the excess resources comprises the steps of:

determining which ones of the planned links have a signal quality less than the minimum signal quality; and distributing the excess resources equally among ones of the planned links which have a signal quality greater than or equal to the minimum signal quality.

20. In a wireless communication system, a method for transmitting signals at desired rates comprising the steps of:

determining a reference modulation/coding rate for each of a plurality of planned links, based on a signal quality of each of the planned links and modulation/coding rates supported by the system;

determining a reference resources size and an associated reference link capacity for each of the planned links in the communication system;

determining a target link capacity for each of the planned links in the communication system; and assigning a resource size to each of the planned links such that each link capacity matches its corresponding target link capacity;

wherein minimum and maximum desired link capacities are selected, and wherein:

if the target link capacity is greater than the maximum desired link capacity, the target link capacity is set to the maximum desired link capacity; and if the target link capacity is less than the minimum desired link capacity, the target link capacity is set to the minimum desired link capacity.

21. The method as recited in claim 20 wherein the resource size is a time slot length.

22. The method as recited in claim 20 wherein the wireless communication system is a code division multiple access system.

23. In a wireless communication system which supports a plurality of modulation/coding rates, a method for transmitting signals comprising the steps of:

determining a reference resource size for each of a plurality of planned links in the communication system;

determining a modulation/coding rate for each of the planned links, each modulation/coding rate being associated with a minimum resource size; and determining excess resources based upon differences between the reference resource size and the minimum resource size for each of the planned links;

distributing the excess resources among the planned links based on a system criterion;

wherein the step of distributing the excess resources comprises the step of distributing the excess resources to increase system coverage;

wherein a minimum signal quality is required before signals can be transmitted over the planned links, and wherein the step of distributing the excess resources comprises the steps of:

determining whether a signal quality for any of the planned links at the reference resource size is less than the minimum signal quality; and distributing the excess resources among the planned links with the signal quality less than the minimum signal quality.

24. In a wireless communication system which supports a plurality of modulation/coding rates, a method for transmitting signals comprising the steps of:

determining a reference resource size for each of a plurality of planned links in the communication system;

determining a modulation/coding rate for each of the planned links, each modulation/coding rate being associated with a minimum resource size; and determining excess resources based upon differences between the reference resource size and the minimum resource size for each of the planned links;

distributing the excess resources among the planned links based on a system criterion;

wherein the step of distributing the excess resources comprises the step of distributing the excess resources to increase system capacity;

wherein the step of distributing the excess resources comprises the steps of:

determining a reference modulation/coding rate for each of the planned links;

determining for each of the planned links additional link transmit power required to increase the reference modulation/coding rate to a higher modulation/coding rate; and determining an aggregate of the additional link transmit power which substantially maximizes the system capacity.

25. The method as recited in claim 24 wherein the resource size is time slot length.

26. The method as recited in claim 24 wherein the resource size is transmit power.

* * * * *